(12) United States Patent
Shimane et al.

(10) Patent No.: US 7,472,886 B2
(45) Date of Patent: Jan. 6, 2009

(54) FLUID CONTROL VALVE

(75) Inventors: Osamu Shimane, Kariya (JP); Kunio Nanba, Anjo (JP)

(73) Assignee: Denso Corporation (JP)

( * ) Notice: Subject to any disclaimer, the term of this patent is extended or adjusted under 35 U.S.C. 154(b) by 155 days.

(21) Appl. No.: 11/507,563

(22) Filed: Aug. 22, 2006

(65) Prior Publication Data

US 2007/0045586 A1 Mar. 1, 2007

(30) Foreign Application Priority Data

Aug. 30, 2005 (JP) ............................. 2005-248609

(51) Int. Cl.
*F16K 1/22* (2006.01)
(52) U.S. Cl. ...................... 251/305; 251/316
(58) Field of Classification Search ......... 251/305–308, 251/316; 123/568.23, 568.24
See application file for complete search history.

(56) References Cited

U.S. PATENT DOCUMENTS

| | | | | |
|---|---|---|---|---|
| 4,290,615 A | * | 9/1981 | Etcheverry | ................... 251/307 |
| 4,632,360 A | * | 12/1986 | DeSalve | ..................... 251/175 |
| 4,860,994 A | * | 8/1989 | Oshima | ....................... 251/113 |
| 4,899,984 A | * | 2/1990 | Strickler et al. | ............. 251/306 |
| 6,149,130 A | * | 11/2000 | Thurston et al. | ............ 251/173 |
| 7,168,682 B2 | | 1/2007 | Nanba et al. | |
| 7,234,444 B2 | | 6/2007 | Nanba et al. | |

FOREIGN PATENT DOCUMENTS

| | | |
|---|---|---|
| CN | 2379659 Y | 5/2000 |
| CN | 2709725 Y | 7/2005 |
| EP | 1 420 158 B2 | 5/2004 |
| JP | 60-245880 | 12/1985 |
| JP | 2005-113872 A | 4/2005 |

OTHER PUBLICATIONS

Korean Examination Report issued Jun. 15, 2007 in corresponding Korean Appln. No. 10-2006-0082013 with an English translation.
First Office Action issued in CN Application No. 200610125749.4 dated Dec. 28, 2007 with English translation.

* cited by examiner

*Primary Examiner*—John K Fristoe, Jr.
(74) *Attorney, Agent, or Firm*—Nixon & Vanderhye PC

(57) ABSTRACT

A fluid control valve assembly is disclosed that includes a housing, a valve with a ring-shaped groove, and a seal ring with a clearance extending between an outer diameter and an inner diameter. The seal ring includes a pair of opposing axial side surfaces and is provided in the groove. The seal ring seals against the housing when the valve is in the closed position. The valve assembly also includes a backup ring provided in the groove adjacent one of the axial side surfaces of the seal ring to thereby obstruct fluid flow through the clearance of the seal ring when the valve is in the closed position.

13 Claims, 4 Drawing Sheets

FLUID CONTROL VALVE

CROSS REFERENCE TO RELATED APPLICATION(S)

The following claims priority to Japanese Patent Application No. 2005-248609, filed Aug. 30, 2005, which is incorporated herein by reference.

FIELD

The present invention relates to a fluid control valve assembly for controlling the flow of fluid flowing in a fluid passage.

BACKGROUND

It is known to provide an exhaust system with an exhaust gas recirculation device (EGR device). In these devices, exhaust gas of a vehicle flowing in the exhaust system of a vehicle is mixed with intake air flowing in the intake pipe to thereby reduce the gas temperature. As such, harmful material (e.g., nitrogen oxide) in the exhaust gas is reduced. However, such recirculation (i.e., return) of the exhaust gas can cause reduction of the output and drivability of the internal combustion engine. Thus, it may be necessary to adjust the volume of exhaust gas recirculated from the exhaust pipe to the intake pipe.

In partial response to this need, exhaust systems have been proposed that include an exhaust gas recirculation volume control valve (EGR control valve) that controllably changes the open area of an exhaust gas recirculation passage to thereby adjust the volume of recirculated exhaust gas. One example of this conventional EGR control valve includes a butterfly type valve mounted on the tip of the valve shaft and transmits the rotational motion of an actuator (e.g., an electric motor with a gear speed reduction mechanism) to rotate the butterfly type valve around the valve shaft between an open and a closed position. More specifically, a circular ring-shaped groove is formed in the outer peripheral surface of the butterfly type valve, and a seal ring is fitted in this seal ring groove to prevent a leak of high-temperature fluid when the valve is closed. In other words, when the valve is closed, the seal ring expands radially to thereby seal against the inner peripheral surface (i.e., the seal surface) of the circular pipe-shaped liner, which houses the butterfly type valve.

The seal ring may be warped due to differences in thermal expansion between the seal ring and the liner. In order to reduce the likelihood of warping, a radial cutout clearance can be provided in the seal ring. However, multiple seal rings are provided that overlap each other, and the seal rings are rotated relative to each other such that the cutout clearance of each is misaligned. As such, fluid leakage through the cutout clearances is unlikely. Also, a backup ring is provided between the two seal rings so as to prevent fluid leakage through the bottom of the seal ring groove and through the cutout clearances. (See for example, Japanese Patent Publication No. 60-245,880.)

However, this type of EGR control valve can be expensive due to the multiple, expensive seal rings and the backup ring included therein. Also, maintaining the seal rings rotated relative to each other may require expensive components. Moreover, in order to fit the backup ring in the seal ring groove, the bottom surfaces of two butterfly plates are assembled into close contact with each other to construct a circular disk-shaped butterfly type valve. That is, the butterfly type valve is constructed of two parts of two butterfly plates. This makes the structure complex and increases the number of parts. Thus, assembly can be complicated and costs can be excessive.

SUMMARY

In one aspect, the present disclosure relates to a fluid control valve assembly for controlling the flow of a fluid. The valve assembly includes a housing that defines a fluid passage and a valve with a ring-shaped groove. The valve is provided in the fluid passage. Also, the valve has an open position for allowing the fluid to flow in the fluid passage, and the valve has a closed position for reducing the flow of the fluid in the fluid passage. The valve assembly also includes a seal ring with a clearance extending between an outer diameter and an inner diameter of the seal ring, and the seal ring includes a pair of opposing axial side surfaces. The seal ring is provided in the groove, and the seal ring seals against the housing when the valve is in the closed position to thereby reduce flow of the fluid through the housing. Furthermore, the valve assembly includes a backup ring provided in the groove adjacent one of the axial side surfaces of the seal ring to thereby obstruct fluid flow through the clearance of the seal ring when the valve is in the closed position.

In another aspect, the present disclosure relates to a fluid control valve assembly for controlling the flow of a fluid. The valve assembly includes a housing that defines a fluid passage and a valve with a ring-shaped groove and a pair of ring-shaped protruded portions on opposing sides of the groove. The valve is provided in the fluid passage. Also, the valve has an open position for allowing the fluid to flow in the fluid passage, and the valve has a closed position for reducing the flow of the fluid in the fluid passage. The valve assembly also includes a seal ring with a clearance extending between an outer diameter and an inner diameter of the seal ring, and the seal ring is provided in the groove. The seal ring seals against the housing when the valve is in the closed position to thereby reduce flow of the fluid through the housing. Moreover, the valve assembly includes a backup ring provided in the groove to thereby obstruct fluid flow through the clearance of the seal ring when the valve is in the closed position. An outer diameter of one of the ring-shaped protruded portions is smaller than an outer diameter of the other ring-shaped protruded portion.

In still another aspect, the present disclosure relates to a fluid control valve assembly for controlling the flow of a fluid. The valve assembly includes a housing that defines a fluid passage and a valve with a ring-shaped groove provided in the fluid passage. The valve has an open position for allowing the fluid to flow in the fluid passage, and wherein the valve has a closed position for reducing the flow of the fluid in the fluid passage. The valve assembly also includes a seal ring provided in the groove. The seal ring seals against the housing when the valve is in the closed position to thereby reduce flow of the fluid through the housing. An outer diameter of one of the ring-shaped protruded portions is smaller than an outer diameter of the other ring-shaped protruded portion.

BRIEF DESCRIPTION OF THE DRAWINGS

FIGS. 6A and 6B are cross-sectional views of the fluid control valve assembly with the backup ring of FIG. 5, wherein FIG. 6A is an exploded view of the fluid control valve assembly and FIG. 6B is an assembled view of the fluid control valve assembly.

DETAILED DESCRIPTION OF THE EMBODIMENTS

Figure 1:
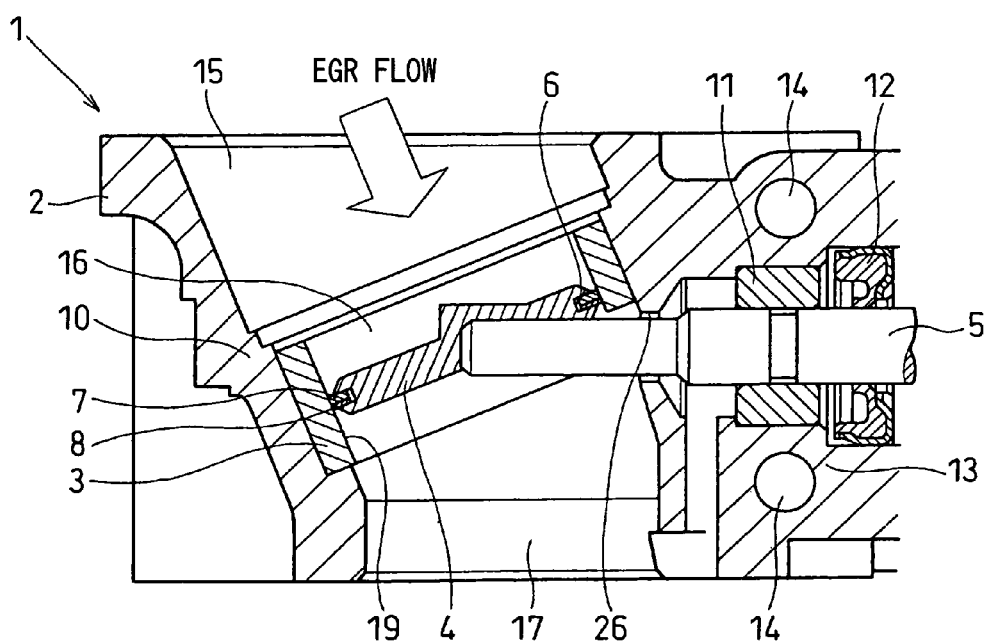
FIG. 1 is a cross-sectional view of one embodiment of a fluid control valve assembly.
Figure 2A:
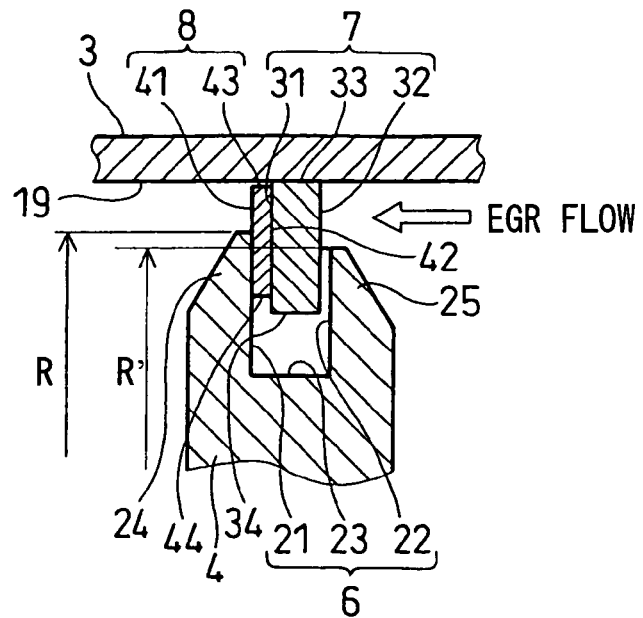
FIG. 2A is a cross-sectional view of a portion of the fluid control valve assembly.
Figure 2B:
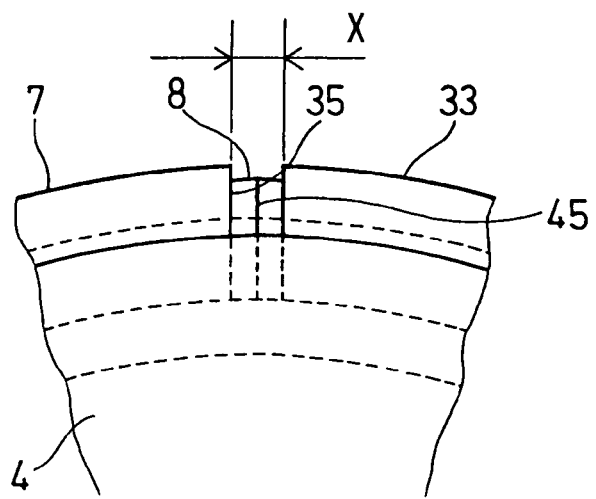
FIG. 2B is an end view of a portion of the fluid control valve assembly viewed downstream.

FIGS. 1, 2A, and 2B show one embodiment of a fluid control valve assembly 1. In one embodiment, the fluid control valve assembly 1 is employed for use in an exhaust gas recirculation volume control valve assembly. However, those having ordinary skill in the art will appreciate that the fluid control valve assembly 1 can be employed in any suitable fluid control system without departing from the scope of the present disclosure.

In one embodiment, the fluid control valve assembly 1 is used in an internal combustion engine (hereinafter referred to as "engine") such as a diesel engine of a vehicle such as an automobile. The fluid control valve assembly 1 is fluidly coupled with an exhaust gas recirculation pipe (not shown), which is fluidly coupled to an exhaust passage of the engine. In one embodiment, the upstream end of the exhaust gas recirculation pipe is connected to the exhaust manifold of the exhaust pipe, and the downstream end of the exhaust gas recirculation pipe is connected to the intake manifold of the intake pipe. A portion of the exhaust gas (hereinafter referred to as "EGR gas") is recirculated into an intake passage of an intake pipe. The fluid control valve assembly 1 (hereinafter referred to as the EGR control valve 1) controls the volume of recirculating EGR gas flowing in the exhaust gas recirculation passage.

The EGR control valve assembly 1 of this embodiment includes a housing 2 that defines a fluid passage. In the embodiment shown, the fluid passage includes first and second exhaust gas recirculation passages 15, 17. The housing 2 also defines a cylindrical liner-fitting portion 10 between the passages 15, 17. The housing 2 also includes a pipe-shaped liner 3 that is provided between the first and second passages 15, 17.

The EGR control valve assembly 1 also includes a butterfly-type valve 4 provided in the liner 3 of the housing 2. The valve 4 can be positioned in an open position for allowing fluid to flow from the first exhaust gas recirculation passage 15 to the second exhaust gas recirculation passage 17. The valve 4 can also be positioned in a closed position for reducing (e.g., preventing) such flow of the exhaust gas. In one embodiment, the valve 4 can also be positioned and held in an intermediate position between the fully open and fully closed position for adjusting the flow through the passages 15, 17. In FIG. 1, the valve 4 is illustrated in the closed position. The valve assembly 1 also includes a valve biasing means (not shown) such as a return spring for biasing this butterfly type valve 4 toward one of the open and closed positions.

In the embodiment shown, the butterfly type valve 4 has a valve shaft 5 that receives the driving force of an actuator such as an electric motor and a power transmission mechanism. As such, the valve shaft 5 is rotated and held in position.

Moreover, a circular ring-shaped seal ring groove 6 (i.e., a ring-shaped groove 6) is formed in the outer peripheral surface of the butterfly type valve 4. A seal ring 7 and a backup ring 8 are provided in the seal ring groove 6.

When the valve 4 is in the closed position, the butterfly type valve 4 is set in a direction approximately orthogonal (i.e., vertical) to the surface of the liner 3 and approximately orthogonal to the direction of flow of EGR gas (i.e., high-temperature fluid) flowing in the liner 3. A seal is created between the seal ring 7 and the surface of the liner 3 due to expansion of the seal ring 7 in the radial direction as will be explained in greater detail below.

In one embodiment, a valve driving device for opening or closing the butterfly type valve 4 is an electrically operated actuator including a power unit. The actuator is constructed of an electric motor and a power transmission mechanism (e.g., a gear speed reduction mechanism) for transmitting the rotational motion of the motor shaft (i.e., output shaft) of the electric motor to the valve shaft 5. In one embodiment, a direct current (DC) motor such as a brushless DC motor or a DC motor with a brush is used as the electric motor. An alternating current (AC) motor such as a three-phase induction motor may be used as the electric motor. The gear speed reduction mechanism reduces the rotational speed of the motor shaft of the electric motor so as to generate a predetermined reduction ratio for transmitting the motor output shaft torque (i.e., driving force) of the electric motor to the valve shaft 5. In one embodiment, the electric motor is energized and controlled by an engine control unit (hereinafter referred to as "ECU").

The ECU has a CPU for performing control processing and operation processing, a storage device (i.e., memory such as ROM and RAM) for storing various programs and data, and a micro computer having a well-known structure including the functions of an input circuit, an output circuit, and the like. Moreover, the ECU is so constructed as to electronically control the degree of opening of the valve (i.e., valve opening) of the butterfly type valve 4 on the basis of control programs stored in the memory when an ignition switch (not shown) is turned on. In one embodiment, the ECU also completes the above-mentioned control based on the control programs when the ignition switch is turned off. The ECU is constructed so that sensor signals from various kinds of sensors are converted by an A/D converter and then inputted to the microcomputer built in the ECU. The microcomputer has an EGR volume sensor, a crank angle sensor, an accelerator position sensor, an air flow meter, a cooling water temperature sensor, and the like connected thereto.

The housing 2 is formed of aluminum alloy in a specified shape by die casting. The housing 2 has an inlet-side opening end connected to an exhaust manifold via an exhaust gas recirculation pipe and an outlet-side opening end connected to an intake manifold (or a surge tank or a throttle body) via an exhaust gas recirculation pipe. The housing 2 is fixed to the exhaust gas recirculation pipe or the intake pipe of the engine by the use of a fastening part (not shown) such as a bolt.

Also, a cylindrical valve bearing part 13 is included which rotatably supports the valve shaft 5 rotating integrally with the butterfly type valve 4 via a bearing part, such as a bushing 11 or a ball bearing, and an oil seal 12, such as rubber seal or packing such as rubber seal. Furthermore, a cooling water pipe (not shown) is connected to the housing 2 for circulating engine cooling water within a specified temperature range (e.g., 75° C. to 80° C.) through a cooling water circulation passage 14. For example, the circulation passage 14 is included near the totally closed valve position or around the liner fitting part 10 or a valve shaft bearing part 13.

The liner 3 is a cylindrical part forming a portion of the exhaust gas recirculation pipe and housing the butterfly type valve 4 in a such a way that the butterfly type valve 4 can be freely opened and closed. In one embodiment, the liner 3 is formed of a heat-resistant material resistant to high temperature (e.g., stainless steel). The liner 3 defines an exhaust gas recirculation passage 16 (i.e., a fluid passage) that fluidly couples the exhaust gas recirculation passages 15, 17. The inner diameter surface of the liner 3 defines a seal ring seat surface 19 (i.e., cylindrical radial surface). The seal ring 7 seals against the seal ring seat surface 19 when the valve 4 is in the closed position as will be explained in greater detail.

The butterfly type valve 4 is a butterfly type rotary valve that is formed of a heat-resistant material (e.g., stainless steel). The valve 4 is approximately circular and disk-shaped and controls the EGR volume of EGR gas to be mixed with intake air flowing in the intake pipe. The butterfly type valve 4 is closed and opened continuously or stepwise from a totally closed valve position to a totally opened valve position on the basis of a control signal from the ECU to change the opening area of the exhaust gas recirculation passage 16 to thereby control an EGR volume. In the totally closed valve position (e.g., θ=0°) clearance between an outer radial-side end surface of the butterfly type valve 4 (i.e., outer peripheral surface of valve) and the inner peripheral surface of the liner 3 is at a minimum. As such, the volume of leak of EGR gas when the valve is totally closed is at a minimum (i.e., flow is reduced). Moreover, in the open valve position (e.g., θ=70 to 90°) clearance between the end surface of the outer radial-side end surface of the butterfly type valve 4 and the inner peripheral surface of the liner 3 is at a maximum. As such, the volume of leak of EGR gas when the valve is totally open is at a maximum (i.e., flow is increased).

Moreover, as shown in FIG. 2A, a seal ring groove 6 (i.e., a circumferential groove or ring-shaped groove) is continuously formed in the circumferential direction on the end surface of the outer diameter surface of the butterfly type valve 4. The seal ring 7 is mounted in the seal ring groove 6 and can move in the radial direction and in the axial direction while mounted therein.

As shown in FIG. 2A, a pair of first and second ring-shaped protruded portions 24, 25 (i.e., ring-shaped groove walls) are included at the outer radial-side end portion (valve outer peripheral portion) of the butterfly type valve 4 on opposing sides of the seal ring groove 6. More specifically, the valve 4 includes an downstream protruded portion 24 and an upstream protruded portion 25. As such, the seal ring groove 6 includes an upstream surface 21 that faces generally upstream, a downstream surface 22 that faces generally downstream, and a bottom surface 23 that generally faces outwardly and radially. In the cross sectional view of FIG. 2A, the upstream and downstream surfaces 21, 22 are approximately perpendicular to the bottom surface 23. In the embodiment shown, the outer diameter R' of the upstream protruded portion 25 (i.e., the height of the upstream wall) is less than the outer diameter R of the downstream protruded portion 24 (i.e., the height of the downstream wall).

The valve shaft 5 is integrally formed of a heat-resistant material (e.g., stainless steel) and is supported rotatably or slidably by the valve bearing part 13 of the housing 2. A valve-side gear (not shown) of the gear speed reduction mechanism is fixed to the other end portion in the axial direction of the valve shaft 5 (i.e., on the end portion opposite to the valve side). One end in the axial direction of the valve shaft 5 is passed through a shaft through hole 26, which is formed in the liner fitting portion 10 of the housing 2, and protrudes (i.e., is exposed) into the exhaust gas recirculation passages 16, 17. A valve mounting portion for holding and fixing the butterfly type valve 4 by fixing means such as welding is formed on the one end in the axial direction of the valve shaft 5. In the embodiment shown in FIG. 1, the valve shaft 5 is coupled to the butterfly type valve 4 such that the valve shaft 5 and the butterfly type valve 4 (when in the closed position) are at a positive, acute angle with respect to each other.

The seal ring 7 is formed of a heat-resistant material (e.g., stainless steel) and is in the shape of a circular ring. The seal ring 7 includes an outer diameter surface 33 and an inner diameter surface 34. The outer diameter surface 33 is large enough to protrude radially from the seal ring groove 6. The inner diameter surface 34 is small enough to be movably contained within the seal ring groove 6. Also, the seal ring 7 includes a downstream axial side surface 31 and an upstream axial side surface 32. The thickness of the seal ring 7 (i.e., the distance between the axial side surfaces 31, 32) is smaller than the length of the groove 6 such that the seal ring 7 is able to move axially within the groove 6.

When the valve 4 is in the closed position, the outer diameter surface 33 seals against the seal ring seat surface 19 of the liner 3. As such, the seal ring 7 reduces (e.g., prevents) flow of the exhaust gas through the exhaust gas recirculation passage 16 as will be explained in greater detail below.

As shown in FIG. 2B, the seal ring 7 includes a cutout clearance 35 that extends between the outer diameter surface 33 and the inner diameter surface 34. As such, the seal ring 7 is generally C-shaped. The cutout clearance 35 allows the seal ring 7 to expand and contract due to differences in thermal expansion coefficients between the seal ring 7 and the liner 3.

Figure 3A:
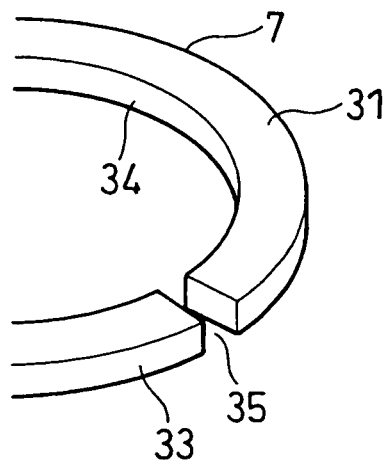
FIGS. 3A to 3D are partial perspective views of embodiments of a seal ring of the fluid control valve assembly.
Figure 3C:
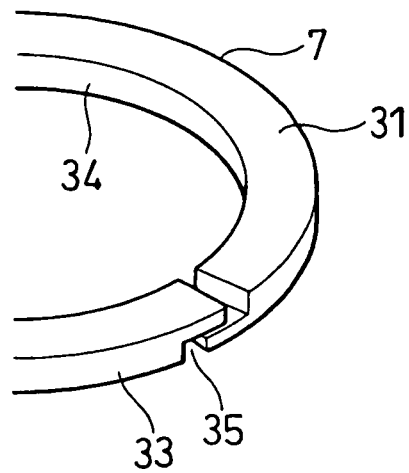
Figure 3B:
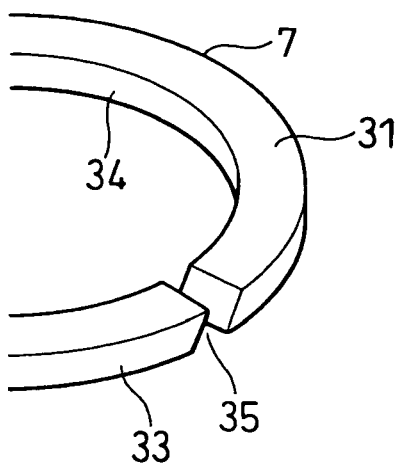
Figure 3D:
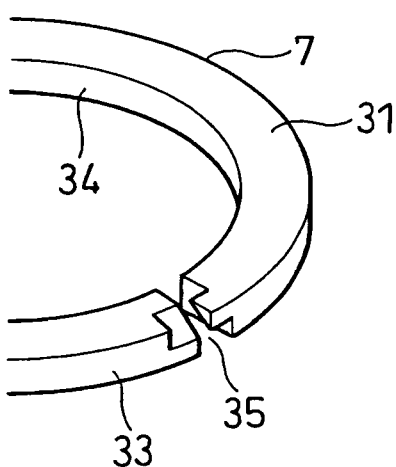

The cutout clearance 35 can have any suitable shape. For instance, FIGS. 3A-3D show four different embodiments of the cutout clearance 35. For instance, the opposed ends of the seal ring 7 may be formed in a butt joint (FIG. 3A), a taper joint (FIG. 3B), a lap joint (FIG. 3C), or a lap joint (FIG. 3D). Moreover, the edges defined by the intersection between the outer diameter surface 33 and the axial side surfaces 31, 32 may be chamfered or curved to facilitate opening and closing of the valve 4.

The backup ring 8 is formed of a heat-resistant material (e.g., stainless steel) and has the shape of a circular ring. The backup ring 8 includes an outer diameter surface 43, an inner diameter surface 44, a downstream axial side surface 41, and an upstream axial side surface 42. The backup ring 8 is movably supported in the groove 6 such that the outer diameter surface 43 projects radially from the groove 6. The inner diameter surface 44 and the thickness of the backup ring 8 is such that the backup ring 8 is able to move within the groove 6 radially and axially. The backup ring 8 is provided in the groove 6 adjacent the downstream axial side surface 31 of the seal ring 7. As shown in FIG. 2A, the outer diameter surface 43 of the backup ring 8 is smaller in diameter than the outer diameter surface 33 of the seal ring 7.

As shown in FIGS. 2A and 2B, when the valve 4 is in the closed position, the backup ring 8 at least partially obstructs the cutout clearance 35 of the seal ring 7 to thereby obstruct (e.g., prevent) fluid flow through the clearance 35. Also, the downstream axial side surface 41 of the backup ring 8 abuts (e.g., seals) against the upstream surface 21 of the valve 4, and the upstream axial side surface 42 of the backup ring 8 abuts against the downstream axial side surface 31 of the seal ring 31.

Figure 4:
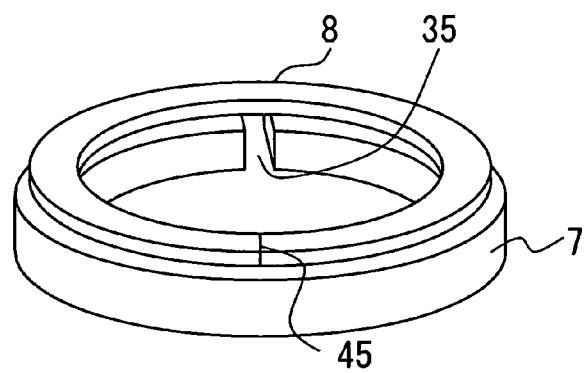
FIG. 4 is a perspective view of another embodiment of the seal ring and a backup ring of the fluid control valve assembly.

In the embodiment shown in FIG. 2B, the backup ring 8 also includes a slit 45 extending radially between the outer diameter surface 43 and the inner diameter surface 44. As shown, the slit 45 is narrower in the X-direction than the clearance 35 of the seal ring 7. The slit 45 is narrow enough to significantly inhibit (i.e., prevent leakage) of the EGR gas therethrough. In the embodiment shown in FIG. 2B, the slit 45 and the clearance 35 are aligned in the axial direction. However, in another embodiment shown in FIG. 4, the slit 45 and the clearance 35 are misaligned in the axial direction. More specifically, the backup ring 8 and the seal ring 7 are rotated approximately 180 degrees relative to each other about the axis such that the slit 45 and the clearance 35 are approximately 180 degrees apart and misaligned in the axial direction.

Next, the operation of the exhaust gas recirculation device of this embodiment will be described in brief.

When the engine is started and the intake valve of the intake port of the cylinder head of the engine is opened, intake air filtered by an air cleaner is passed through an intake pipe and a throttle body and is distributed to the intake manifold of the respective cylinders and then is sucked into the combustion chambers of the respective cylinders of the engine. The intake air is compressed until the temperature increases to the combustion temperature, and then fuel is injected and is combusted. Combustion gas produced in the combustion chambers is discharged from the exhaust ports of the cylinder heads and is discharged through the exhaust manifold and the exhaust pipe.

Electric power is supplied to the electric motor by the ECU so as to bring the butterfly type valve 4 to a predetermined valve open position (i.e., rotational angle). More specifically, the motor shaft of the electric motor is rotated. When the driving force (i.e., motor output shaft torque) of the electric motor is transmitted to the valve shaft 5, the valve shaft 5 is rotated by a specified rotational angle. Hence, the butterfly type valve 4 is rotated and driven in a direction in which the butterfly type valve 4 is opened. Then, at least a portion of exhaust gas (EGR gas) flows through the exhaust passage formed in the exhaust pipe of the engine, an exhaust gas recirculation passage, the exhaust gas recirculation passage 15 of the housing 2, the exhaust gas recirculation passage 16 of the liner 3, the exhaust gas recirculation passage 17 of the housing 2, an exhaust gas recirculation passage in the exhaust gas recirculation pipe, and then flows into the intake manifold.

The EGR gas introduced from the exhaust gas recirculation passage 17 of the housing 2 into the intake manifold is mixed with intake air introduced from the throttle body into the intake manifold. A predetermined EGR volume is maintained at a predetermined value by a detection signal from an intake air volume sensor (i.e., air flow meter), an intake temperature sensor, and an EGR volume sensor. Hence, in order to reduce emission, the valve opening of the butterfly type valve 4 is controlled so as to maintain EGR volume according to an operating state of the engine, and the intake air is mixed with the EGR gas recirculated into the intake manifold.

In contrast, when the supply of electric power to the electric motor is stopped, the butterfly type valve 4 is returned to the totally closed valve position (FIG. 1) by the biasing force of valve biasing means. As such, the seal ring outer diameter surface 33 of the seal ring 7 is placed adjacent and seals against the seal ring seat surface 19 of the liner 3. In one embodiment, the coefficient of thermal expansion of the seal ring 7 is such that the seal ring 7 expands radially due to elevated temperature, and tension force from the seal ring 7 against the ring seat surface 19 maintains the seal therebetween. In the embodiment shown in FIG. 2A, a clearance remains between the backup ring 8 and the seating surface 19, and only the seal ring 7 seals against the seat surface 19.

Also, when the valve 4 is in the closed position, the seal ring 7 is moved downstream in the axial direction in the seal ring groove 6 due to pressure of the EGR gas (i.e., exhaust pressure). As a result, the downstream seal ring side surface 31 of the seal ring 7 is pressed onto (i.e., seal against) the upstream backup ring side surface 42, and the downstream backup ring side surface 41 is pressed onto (i.e., seals against) the upstream groove wall surface 21. Therefore, when the valve is totally closed, the passage 16 is sealed due to axial movement of the seal ring 7 and backup ring 6 due to EGR pressure and due to thermal expansion of the seal ring 7 in the radial direction.

As stated, the cutout clearance 35 is provided in the seal ring 7. However, leakage of the EGR gas through the cutout clearance 35 is limited (e.g., prevented) because the backup ring 8 overlaps the seal ring 7 and obstructs such flow. Thus, leakage of EGR gas through the cutout clearance 35 is unlikely, and EGR gas is unlikely to mix with the intake air.

Thus, the number parts is reduced, thereby simplifying assembly and lowering costs. Specifically, only one seal ring 7 is used for sealing against the seat surface 19 of the liner 3. Furthermore, only one backup ring 8 is included.

Furthermore, as stated, the outside diameter R' of the upstream protruded portion 25 (i.e., the height of the upstream wall) is smaller than the outside diameter R of the downstream protruded portion 24 (i.e., the height of the downstream wall). As such, the seal ring 7 is better exposed to the EGR gas and receives the pressure (i.e., exhaust pressure) therefrom. Hence, the seal ring 7 and the backup ring 8 more readily move in the axial direction due to the gas pressure. Accordingly, the sealing action is enhanced.

Figure 5:
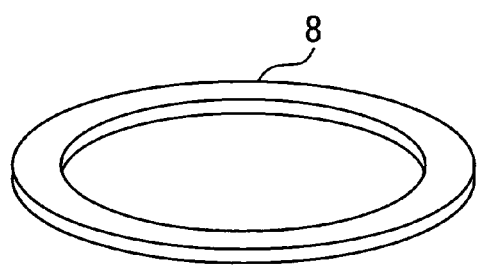
FIG. 5 is a perspective view of another embodiment of the backup ring of the fluid control valve assembly.
Figure 6A:
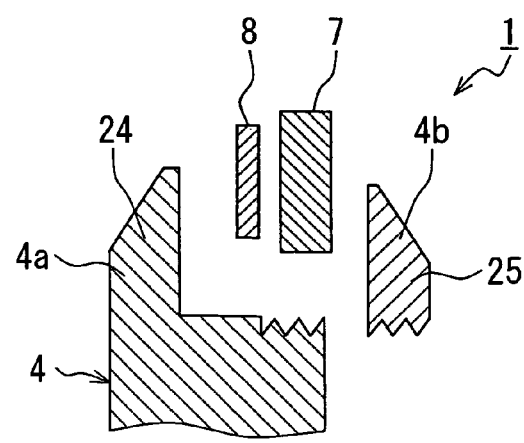
Figure 6B:
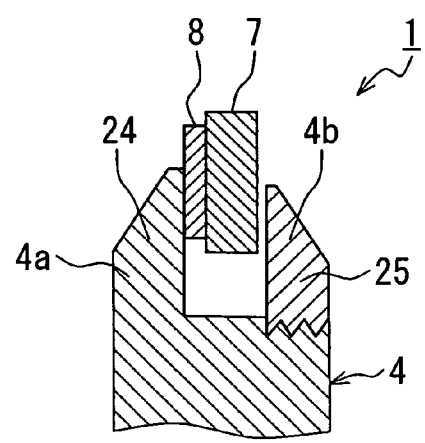

Referring now to FIGS. 5, 6A, and 6B, another embodiment of the valve assembly 1 is shown. Components that correspond with components described above has corresponding numbering in the Figures.

In the embodiment shown, the backup ring 8 is continuous in the circumferential direction. In other words, the backup ring 8 does not include the slit 45 of the embodiment described above.

Also, the valve 4 includes a main body 4a and a retainer 4b that is removably coupled to the main body 4a. The main body 4a includes the downstream protruded portion 24 as described above, and the retainer 4b includes the upstream protruded portion 25 as described above. In other words, the groove 6 is defined between the main body 4a and the retainer 4b. Thus, the seal ring 7 and the backup ring 8 are provided between the main body 4a and the retainer 4b.

In the embodiment shown, the main body 4a and the retainer 4b are threadably coupled. More specifically, the main body 4a includes male threading, and the retainer 4b includes female threading for threadably coupling and decoupling the main body 4a and the retainer 4b.

In another embodiment, the seal ring 7 seals directly against the inner diameter surface of the passage 16, and a liner 3 is not included. As such, the number of parts is further reduced, thereby reducing cost and simplifying assembly.

Furthermore, in one embodiment, the butterfly type valve 4 is fastened and fixed to the valve shaft 5 by the use of fasteners, such as a fastening screw or a fixing bolt.

Moreover, in one embodiment, the valve driving device for opening or closing the valve 4 is a negative pressure-operated actuator having a negative pressure control valve of an electromagnetic type or an electric type or an electromagnetically operated actuator such as an electromagnetic fluid control valve. Thus, a biasing means such as a spring is unnecessary.

In addition, in the embodiment described above, the butterfly type valve 4 rotates around the rotational central axis of the valve shaft 5. However, it will be appreciated that other valves such as a plate type valve, a poppet type valve, a double poppet type valve, or a rotary type valve may be used for the valve.

In the embodiment disclosed above, the housing 2 is connected to the middle of the exhaust gas recirculation pipe. However, the housing may form a part of the intake pipe and a part of exhaust gas recirculation pipe of the engine. Moreover, the housing may form a part of the exhaust pipe and a part of the exhaust gas recirculation pipe of the engine. Furthermore, the valve of the present invention may be applied to an intake control valve such as a throttle valve for controlling the volume of intake air sucked into the combustion chamber of the engine, an exhaust gas control valve for controlling the volume of exhaust gas discharged from the combustion chamber of the engine, and/or an idle rotational speed control valve for controlling the volume of intake air bypassing a throttle valve. Still further, the valve of the present invention may be applied to a valve body of a fluid control valve (i.e., flow rate control valve) for controlling the flow rate of fluid such as gas and liquid.

In the embodiment described above, the fluid control valve is applied to the EGR control valve 1 for controlling the flow rate of fluid such as EGR gas (i.e., high-temperature fluid). However, the fluid control valve does need to be limited to such fluid flow rate control valve but may be applied also to a fluid passage opening/closing valve, a fluid passage switching valve, and a fluid pressure control valve. Moreover, the fluid control valve of the present invention may be applied to an intake air flow control valve such as a tumble flow control valve and a swirl flow control valve and to an intake air varying valve for varying the passage length or the cross-sectional area of an air intake passage.

The present invention has been described in an illustrative manner. It is to be understood that the terminology, which has been used, is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A fluid control valve assembly for controlling the flow of a fluid comprising:
   a housing that defines a fluid passage;
   a valve with a ring-shaped groove, the valve provided in the fluid passage, wherein the valve has an open position for allowing the fluid to flow in the fluid passage, and wherein the valve has a closed position for reducing the flow of the fluid in the fluid passage;
   a seal ring with a cutout clearance extending between an outer diameter and an inner diameter of the seal ring, wherein the seal ring includes a pair of opposing axial side surfaces, wherein the seal ring is provided in the groove, and wherein the seal ring seals against the housing when the valve is in the closed position to thereby reduce flow of the fluid through the housing; and
   a backup ring provided in the groove adjacent one of the axial side surfaces of the seal ring to thereby obstruct fluid flow through the clearance of the seal ring when the valve is in the closed position, wherein:
   the backup ring is one of:
      a slitted backup ring that includes a slit, which extends between an outer diameter and an inner diameter of the backup ring and has a size smaller than that of the cutout clearance of the seal ring in a circumferential direction; and
      a slitless backup ring that extends continuously all around the groove in the circumferential direction;
   the seal ring and the backup ring protrude radially outwardly from the valve; and
   an outer diameter of the backup ring is less than that of the seal ring.

2. The fluid control valve assembly according to claim 1, wherein the backup ring is the slitted backup ring.

3. The fluid control valve assembly according to claim 2, wherein the slit and the clearance are misaligned in an axial direction.

4. The fluid control valve assembly according to claim 1, wherein the backup ring includes a downstream axial side surface and an upstream axial side surface; wherein the groove includes an upstream surface; and wherein the upstream axial side surface of the backup ring abuts against one of the axial side surfaces of the seal ring and the downstream axial side surface abuts against the upstream surface of the groove when the valve is in the closed position.

5. The fluid control valve assembly according to claim 1, wherein the backup ring is the slitless backup ring.

6. The fluid control valve assembly according to claim 5, wherein the valve includes a main body and a retainer that is removably coupled to the main body, wherein the backup ring and the seal ring are coupled to the valve between the main body and the retainer.

7. The fluid control valve assembly according to claim 6, wherein the retainer is threadably coupled to the main body.

8. The fluid control valve assembly according to claim 1, wherein the seal ring has a coefficient of thermal expansion such that the seal ring expands in a radial direction to thereby seal against the housing when the valve is in the closed position.

9. A fluid control valve assembly for controlling the flow of a fluid comprising:
   a housing that defines a fluid passage;
   a valve with a ring-shaped groove and a pair of ring-shaped protruded portions on opposing sides of the groove, the valve provided in the fluid passage, wherein the valve has an open position for allowing the fluid to flow in the fluid passage, and wherein the valve has a closed position for reducing the flow of the fluid in the fluid passage;
   a seal ring with a clearance extending between an outer diameter and an inner diameter of the seal ring, wherein the seal ring is provided in the groove, and wherein the seal ring seals against the housing when the valve is in the closed position to thereby reduce flow of the fluid through the housing; and
   a backup ring provided in the groove to thereby obstruct fluid flow through the clearance of the seal ring when the valve is in the closed position;
   wherein an outer diameter of one of the ring-shaped protruded portions is smaller than an outer diameter of the other ring-shaped protruded portion;
   wherein the backup ring is provided downstream of the seal ring when the valve is in the closed position;
   wherein the one of the ring-shaped protruded portions is provided upstream of the backup ring and the seal ring in a flow direction of the fluid when the valve is in the closed position; and
   wherein the other ring-shaped protruded portion is provided downstream of the backup ring in the flow direction of the fluid when the valve is in the closed position.

10. The fluid control valve assembly according to claim 9, wherein the seal ring has a coefficient of thermal expansion such that the seal ring expands in a radial direction to thereby seal against the housing when the valve is in the closed position.

11. A fluid control valve assembly for controlling the flow of a fluid comprising:
a housing that defines a fluid passage;
a valve with a ring-shaped groove and a pair of ring-shaped protruded portions on opposing sides of the groove, the valve provided in the fluid passage, wherein the valve has an open position for allowing the fluid to flow in the fluid passage, and wherein the valve has a closed position for reducing the flow of the fluid in the fluid passage; and
a seal ring provided in the groove, wherein the seal ring seals against the housing when the valve is in the closed position to thereby reduce flow of the fluid through the housing;
wherein an outer diameter of one of the ring-shaped protruded portions is smaller than an outer diameter of the other ring-shaped protruded portion;
wherein the one of the ring-shaped protruded portions is provided upstream of the seal ring in a flow direction of the fluid when the valve is in the closed position; and
wherein the other ring-shaped protruded portion is provided downstream of the seal ring in the flow direction of the fluid when the valve is in the closed position.

12. The fluid control valve assembly according to claim 11, further comprising a backup ring provided in the groove downstream of the seal ring, wherein, when the valve is in the closed position, the seal ring seals against the backup ring, and the backup ring seals against the one of the ring-shaped protruded portions of the valve.

13. The fluid control valve assembly according to claims 12, wherein the seal ring has a coefficient of thermal expansion such that the seal ring expands in a radial direction to thereby seal against the housing when the valve is in the closed position.

\* \* \* \* \*